(12) United States Patent
Held et al.

(10) Patent No.: US 9,184,953 B2
(45) Date of Patent: Nov. 10, 2015

(54) PROGRAMMABLE SIGNAL PROCESSING CIRCUIT AND METHOD OF DEMODULATING VIA A DEMAPPING INSTRUCTION

(75) Inventors: Ingolf Held, Eindhoven (NL); Marcus M. G. Quax, Eindhoven (NL); Paulus W. F. Gruijters, Eindhoven (NL)

(73) Assignee: INTEL CORPORATION, Santa Clara, CA (US)

( * ) Notice: Subject to any disclaimer, the term of this patent is extended or adjusted under 35 U.S.C. 154(b) by 1897 days.

(21) Appl. No.: 11/721,050

(22) PCT Filed: Dec. 13, 2005

(86) PCT No.: PCT/IB2005/054201
§ 371 (c)(1),
(2), (4) Date: Sep. 28, 2009

(87) PCT Pub. No.: WO2006/064460
PCT Pub. Date: Jun. 22, 2006

(65) Prior Publication Data
US 2010/0017453 A1    Jan. 21, 2010

(30) Foreign Application Priority Data

Dec. 14, 2004 (EP) .................................... 04106566

(51) Int. Cl.
*G06F 9/30* (2006.01)
*H04L 27/38* (2006.01)
*H04L 25/06* (2006.01)

(52) U.S. Cl.
CPC .......... *H04L 25/067* (2013.01); *G06F 9/30007* (2013.01); *H04L 27/38* (2013.01)

(58) Field of Classification Search
None
See application file for complete search history.

(56) References Cited

U.S. PATENT DOCUMENTS 6,956,872 B1 * 10/2005 Djokovic et al. ............. 370/505
2001/0042193 A1 * 11/2001 Fleck et al. .................... 712/220

(Continued)

FOREIGN PATENT DOCUMENTS

| EP | 0 794 487 A2 | 9/1997 |
| EP | 0 936 537 A1 | 8/1999 |

(Continued)

OTHER PUBLICATIONS

International Search Report for PCT/IB2005/054201 dated Mar. 9, 2006.

(Continued)

*Primary Examiner* — Jacob A Petranek
(74) *Attorney, Agent, or Firm* — Leydig, Voit & Mayer, Ltd.

(57) ABSTRACT

A programmable signal processing circuit has an instruction processing circuit (23, 24. 26), which has an instruction set that comprises a demapping instruction. The instruction processing circuit (23, 24, 26) has an operand input (30a) for receiving a complex number operand of the demapping instruction from a register file (22) and a result output (34) for writing a demapping result of the demapping instruction to the register file (22). The instruction processing circuit (23, 24, 26) determines at least four bit metrics in response to the demapping instruction, each indicating a relative position of the complex number relative to respective border line in a complex plane. The instruction processing circuit (23, 24, 26) writes a combination of the at least four bit metrics together to the result output (34) in the demapping result.

9 Claims, 3 Drawing Sheets

(56) References Cited

U.S. PATENT DOCUMENTS

Figure 1:
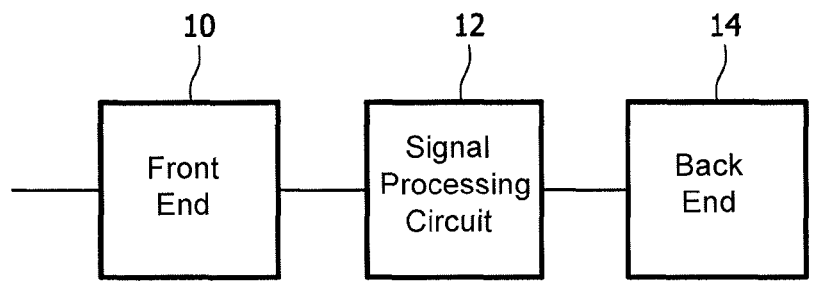

2003/0018941 A1 1/2003 Miyata et al.
2003/0123582 A1 7/2003 Kim et al.
2004/0233976 A1 11/2004 Han et al.

FOREIGN PATENT DOCUMENTS

| EP | 1 284 567 A | 2/2003 |
| JP | 2001-313571 A | 11/2001 |
| JP | 2002-073329 A | 3/2002 |
| JP | 2002-094592 A | 3/2002 |
| JP | 2003-124843 A | 4/2003 |

OTHER PUBLICATIONS

Japanese Patent Office, Notification of Reason for Rejection in Japanese Patent Application No. 2007-546273 (Aug. 9, 2011).
European Patent Office, Summons to Attend Oral Proceedings Pursuant to Rule 115(1) EPC dated Jan. 12, 2014 in corresponding European Application No. 05824327.0 (7 pages).

* cited by examiner

PROGRAMMABLE SIGNAL PROCESSING CIRCUIT AND METHOD OF DEMODULATING VIA A DEMAPPING INSTRUCTION

The invention relates to a programmable signal processing circuit and to a method of demodulating data.

The DVB (Digital Video Broadcasting) standard provides for transmission digital television signals that have been modulated onto a multicarrier signal. Various modulation techniques can be used, such as BPSK (Binary Phase Shift Keying), QPSK (Quadrature Phase Shift Keying), 16-QAM (16 value Quadrature Amplitude Modulation) and 64-QAM (64 value Quadrature Amplitude Modulation). A modulated signal that has been modulated according to any of these modulation techniques can be represented by a combination of phase and amplitude relative to a reference. In the case of BPSK two combinations of phase and amplitude are nominally possible, both with the same amplitude, but with mutually opposite phase, the combinations corresponding to two different modulated bit values. In the case of 64 QAM 64 combinations of phase and amplitude are nominally possible. Plotted in the complex plane, these combinations lie on an 8×8 grid of locations, each of which corresponds to a different combination of values of six bit values. The other modulation techniques correspond to grids with fewer points.

Demodulation of this type of modulated signal involves the assignment of bit values according to the complex number that correspond to amplitude and phase value of a received signal. This processes in called demapping and may be implemented as a series of arithmetic computations using complex numbers. For demapping of a BPSK signal it suffices to determine the real part of a complex number that has been obtained. A positive value of the real part corresponds to one bit value, a negative value of the real part corresponds to another bit value. The size of these values can be used to estimate the reliability of the demodulated bits. For demapping of the other modulated signals more computations are needed. For 16-QAM demapping for example, in addition to the real part, the imaginary part and the differences between the absolute values of the real and imaginary parts and a reference value may be computed. The sign of these quantities can subsequently be used to select demodulated bits. More generally, the signs or information about the size of these quantities can be used as "bit metrics" to indicate the likelihood that one bit value or another has been transmitted.

This type of demapping may be implemented either by means of a programmable arithmetic computation circuit that has been programmed with a program with instructions to compute the required numbers, or by means of dedicated hardware that produces results that are equivalent to these numbers. The programmed approach has the advantage that the circuits that are used for the demapping computations can also be used for other necessary computations without requiring additional circuitry. However, the programmed approach has the disadvantage that a faster circuit and more power consumption is needed to demap the data.

Among others, it is an object of the invention to reduce the number of instruction cycles that is needed to perform demapping using a programmable signal processor.

Among others, it is an object of the invention to provide for an instruction processing circuit that is capable of performing demapping of signals that have been modulated with different types of modulation efficiently.

A programmable signal processing circuit according to the invention is set forth in claim 1. According to the invention the programmable signal processing circuit comprises an instruction processing circuit that has an instruction set with a demapping instruction. The demapping instruction has a complex number operand that is typically derived from a received transmission signal. By providing a demapping instruction that combines at least four bit metrics in the same demapping result on the basis of a complex number operand a considerable number of instruction cycles can be saved during demodulation. Preferably, the bit metrics are clipped, or another type of saturating function is applied, before the bit metrics are placed in the demapping result, to reduce the number of bits needed per bit metric.

In an embodiment execution of the demapping instruction includes multiplication of the complex number operand with a further complex number operand, and comparison of the real and/or imaginary component of the result with a border value. The further complex number operand is preferably used when the complex number operand is derived from a received signal. In this case the further complex number operand typically contains an experimentally determined complex factor that describes an amplitude and phase transfer of the transmission channel through which a signal was received. In this case the border value is preferably computed in proportion to the square of the amplitude of the complex factor. In this way it is avoided that the complex number operand has to be divided by the complex factor to correct for the properties of the transmission channel before determination of the bit metrics. This reduces the time needed for the computation of the bit metrics. Typically, an absolute value of the real and/or imaginary part is used for the subtraction so that one subtraction can be used to determine the distance to respective border lined for positive and negative real or imaginary parts. However, alternatively multiple subtractions without prior absolute value determination may be used.

In an embodiment the instruction processing circuit is arranged to determine at least six bit metrics in response to the demapping instruction, each indicating a relative position of the complex number relative to respective border line in the complex plane, and to write the at least six bit metrics in the demapping result. Thus, the demapping instruction can be used for 64-QAM, 16-QAM, QPSK and BPSK demapping. In a further embodiment two bit metrics are formed by subtracting results of the complex multiplication from a border value and two further bit metrics are formed by subtracting another border value from a result of the first subtraction.

Preferably, the instruction processing circuit is constructed so that part of the instruction circuit can be disabled dependent on information specified by the instruction, so that part of the bit metrics are not computed when said part of the instruction circuit is disabled. Thus, if demapping for 16-QAM modulation is performed for example, computation of the additional bit metrics that are needed for demapping of 64-QAM modulation will be disabled. This computation will be enabled when demapping of 64-QAM modulation is performed, further using the same circuits that are used for computing bit metrics for 16-QAM demapping. Such selective disabling saves power. The information that specifies whether part of the instruction circuit should be disabled may be supplied as part of the opcode of the demapping instruction or as an operand of the demapping instruction.

These and other objects and advantageous aspects of the invention will be illustrated from description of the following figures that show non-limitative examples of the invention.

Figures 1A, 1B:
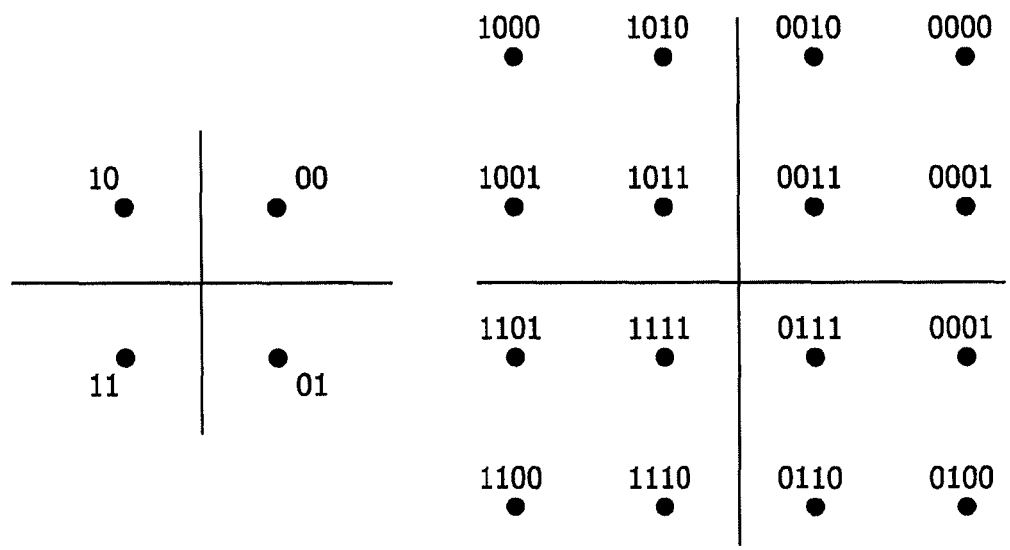
Figure 2:
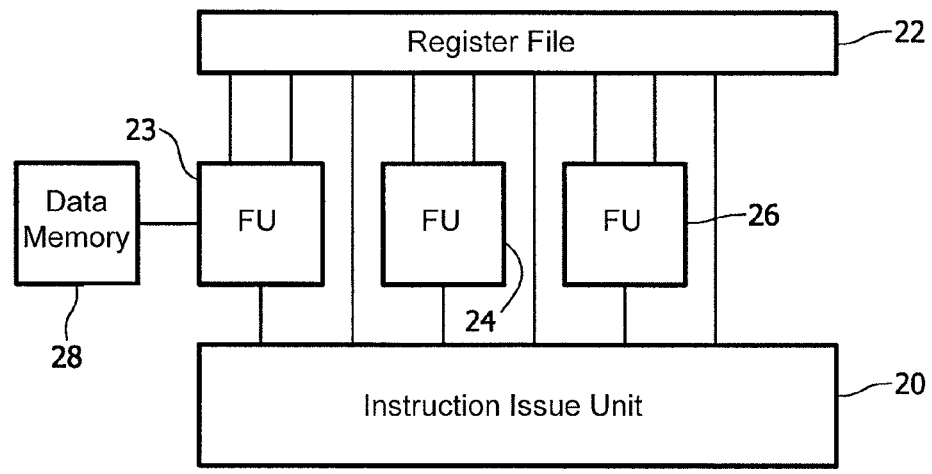
Figure 3:
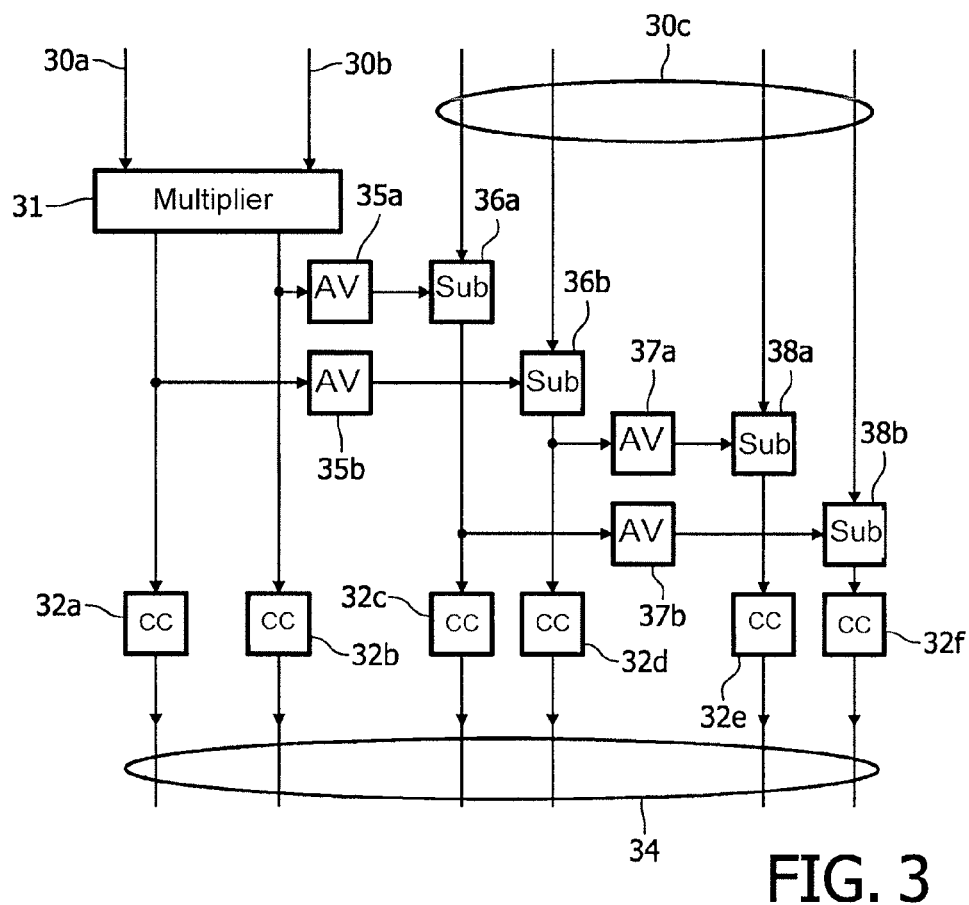
Figure 4:
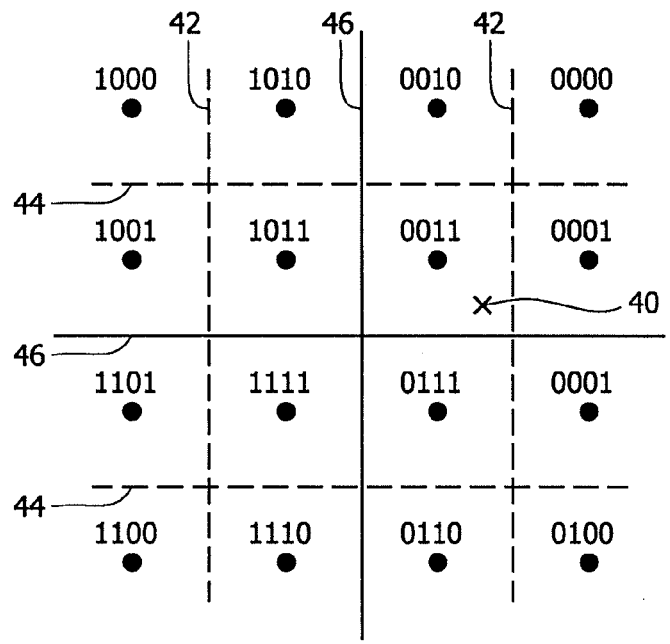
Figure 5:
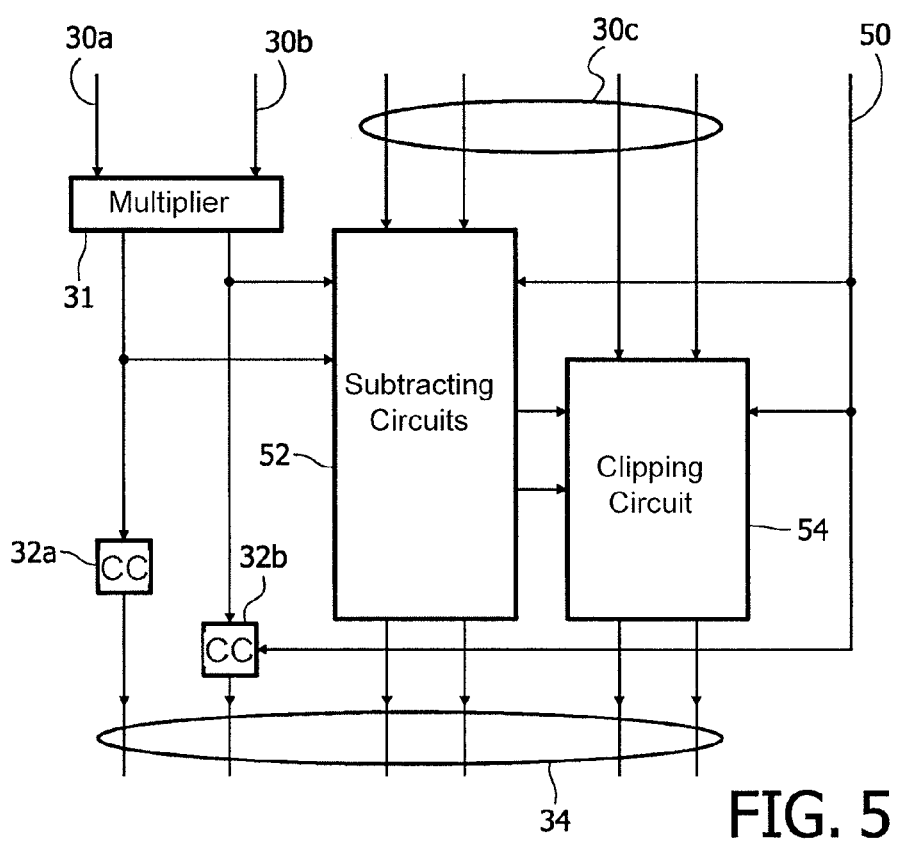

FIG. 1 shows signal receiver apparatus
FIGS. 1a,b illustrate modulation points in a complex plane
FIG. 2 shows a programmable signal processing circuit
FIG. 3 shows a demapping functional unit
FIG. 4 illustrates demodulation FIG. 5 shows a further demapping functional unit FIG. 1 shows a signal receiver apparatus, such as a DVB (Digital Video Broadcast) receiver apparatus. The apparatus contains a front end 10, a digital signal processing circuit 12 and a back end 14 connected in cascade. Front end 10 has an input for receiving a video broadcast signal. In operation front end 10 receives the video broadcast signal and retrieves digital information from the signal. Digital signal processing circuit 12 receives the digital information and processes the digital information to form a video data signal. Digital signal processing circuit supplies the video data signal to back end 14, which may generate, for example, display data for a connected video display screen (not shown) or storage data for a connected video recording device (not shown). Back end 14 may contain a video display screen and/or recording device itself for these purposes.

Digital signal processing circuit 12 comprises a programmable signal processing circuit that is programmed with a program to perform such operations as demodulation (using digital signal samples to reconstruct data items that have been used to modulate the sampled signal) and decoding of demodulated data items according to an Error Correcting Code (ECC).

The invention relates to demapping of modulated data in digital signal processing circuit 12. After reception digital signal processing circuit 12 uses information that depends on the phase and amplitude of the received signal to reconstruct binary information. De-mapping is the reverse of modulation, which is performed on the transmitter side before or during transmission. Modulation involves selecting the phase and amplitude of a number of carriers dependent on digital data that must be transmitted. Thus, each digital value corresponds to a complex number that has the corresponding phase and amplitude. During DVB transmission for example, digital data is divided into groups of e.g. four bits, and each combination of bit values is assigned to a respective complex number.

FIGS. 1a,b show a complex plane (real and imaginary parts of the complex numbers being plotted along the x and y-axis respectively) wherein points are indicated that represent respective complex numbers that are assigned to respective groups of bit values. FIG. 1a corresponds to QPSK, wherein complex numbers are assigned to two-bit digital values and FIG. 1b corresponds to 16-QAM wherein complex numbers are assigned to four-bit digital values.

During DVB transmission, the complex numbers that are assigned to respective groups of bits from the data are used as Fourier coefficient from which a temporal transmission signal is computed by means of an inverse Fourier transform (frequency domain to time domain).

On the receiver side the digital data is recovered from complex numbers that represent the received modulation signals. In DVB reception for example, a Fourier transform is computed from temporally spaced signal samples and the resulting Fourier transform coefficients are used as complex numbers to demodulate groups of bits. In a simple example, given a complex number that represents a received signal a nearest complex number from the grid in FIGS. 1a,b is selected and the digital data that corresponds to that point is the recovered digital data.

FIG. 2 shows a programmable signal processing circuit from digital signal processing circuit 12. The programmable signal processing circuit comprises an instruction issue unit 20, a register file 22, a plurality of functional units 23, 24, 26 and a data memory 28. Instruction issue unit 20 stores a program for the digital signal processing circuit, and is arranged to retrieve the instructions as determined by program flow during execution of the program. Instruction issue unit 20 has operation control outputs coupled to functional units 23, 24, 26 for supplying control signals that are determined by the operation codes of the instructions, which identify the operations that must be executed by the functional units 23, 24, 26. Instruction issue unit 20 has register selection outputs coupled to ports of register file 22, for supplying selection signals that indicate the registers that contain operands of the instructions and the registers wherein results of the instructions must be stored. The instructions contain fields that control the selection signals. Output ports of register file 22 are coupled to the functional units 23, 24, 26 for supplying operands from the selected registers and input ports of register file 22 are coupled to the functional units 23, 24, 26 to receive results of execution of the instructions.

Although single lines are shown to indicate communication connections for supplying control codes, register selection codes, operands and results, it will be appreciated that in practice many conductors will be used in parallel in the implementation of such connections. A single line may represent connections for supplying a plurality of register selection codes, or for supplying a plurality of operands or for returning a plurality of results. Furthermore, although three functional units 23, 24, 26 are shown, each with its own connections to instruction issue unit 20 and register file 22 it will be appreciated that in practice more functional units may be present, or fewer, if the functions of different functional units are grouped into a functional units that share common connections to register file 22.

The functional units define an "instruction set" that consists of all types of instructions that can be executed by the processor. As used herein, "instructions" are the basic units of the program that select operations that will be performed by individual functional units. Instructions are the "atoms" of the program that cannot be split further into units that can serve as instructions. Typically, each instruction has a single op code (operation code) that identifies the instruction. As is well known, design of a programmable processor typically starts from the specification of the instruction set, the specification of the instruction set providing the skilled person sufficient information to select at least a basic implementation of the processor.

A first functional unit 23 is a memory access functional unit that is coupled to data memory 28. This memory access functional unit 23 is designed to execute "LOAD" and "STORE" instructions, with operands that specify addresses of locations in data memory 28. Data memory 28 may also be coupled to front end 10 (not shown) and/or back end 14 (not shown) for receiving signal data and transmitting video data. A second functional unit 24 (which may in fact contain a group of functional units) is designed to execute conventional instructions, such as ALU instructions like ADD, SHIFT etc. Although not shown, further functional units may be present, for example so that several instructions can be executed in parallel, or different instructions can be executed (e.g. input of signal data from front end 10 (not shown) and/or output of video data to back end 14 (not shown)).

As a result of demapping, data in the registers typically represents each bit from the received signal by means of a plurality of bits (e.g. 4 bits) per transmitted bit, to indicate certainty about the received bit value. Such a plurality of operand bits will be referred to as a "bit metric". However, without deviating from the invention, a single operand bit may be used to represent a received bit. In this case "bit metric" refers to such a single bit.

The program of the programmable instruction processor provides for de-mapping of signal data. A specialized third functional unit 26 is a demapping functional unit that is provided to execute demapping instructions that are designed especially to support demapping.

FIG. 3 shows an example of a demapping functional unit. The demapping functional unit has three operand inputs 30*a-c* and a result output 34. Single lines are shown to represent a first and second operand input 30*a,b*, but it should be understood that these lines may represent a plurality of functionally parallel conductors for supplying respective bits of the operands. Each operand input may supply thirty-two bits per operand, for example, which in turn may be used to represent two sixteen bit numbers that represent the real and imaginary part of a complex number. Separate input lines are shown for a third operand input 30*c*. Each input line in turn may represent a group of functionally parallel conductors for supplying a respective multiplication coefficient. The input lines 30*c* of the third operand input are coupled to receive respective groups of bits from the same operand register of an instruction. Similarly, the result at result output 34 comprises a plurality of lines, each representing connections for supplying a group of bits that represents a bit metric, each group containing four bits for example. These groups of bits will be written to respective parts of the same result register of an instruction.

The demapping functional unit comprises a complex multiplier circuit 31, clipping circuits 32*a-f*, absolute value determination circuits 35*a,b*, 37*a,b* and subtracting circuits 36*a,b*, 38*a,b*. Complex multiplier 31 has inputs coupled to a first and second operand input 30*a,b* and outputs for a real product part and for an imaginary product part. The outputs of complex multiplier 31 are coupled to respective lines of result output 34 via respective clipping circuits 32*a-b*.

Furthermore, the outputs of complex multiplier 31 are coupled to negative inputs of a first and second subtracting circuit 36*a,b* each via a respective absolute value determination circuit 35*a,b*. First and second subtracting circuit 36*a,b* have positive inputs coupled to respective lines from third operand input 30*c* and outputs coupled to respective lines of result output 34 via respective clipping circuits 32*c-d*. Furthermore, the outputs of first and second subtracting circuit 36*a,b* are coupled to negative inputs of a third and fourth subtracting circuit 38*a,b* each via a respective absolute value determination circuit 37*a,b*. Third and fourth subtracting circuit 38*a,b* have positive inputs coupled to respective lines from third operand input 30*c* and outputs coupled to respective lines of result output 34 via respective clipping circuits 32*e-f*.

In operation, the demapping functional unit forms a plurality of clipped numbers in respective fields of the result output, according to $$M1 = clip(Re(A*B))$$

$$M2 = clip(Im(A*B))$$

$$M3 = clip(K1 - |Re(A*B)|)$$

$$M4 = clip(K2 - |Im(A*B)|)$$

$$M5 = clip(K3 - |K1 - |Re(A*B)||)$$

$$M6 = clip(K4 - |K2 - |Im(A*B)||)$$

Herein A, B are complex numbers, the real and imaginary part of A being taken from via first operand input 30*a*, the real and imaginary part of B being taken from via second operand input 30*b*. |...| denotes taking the absolute value (taking minus an input value if the input is negative and passing the input value otherwise). The clipping function "clip" converts its input value to a maximum value or a minimum value when the input value is above a first threshold or below a second threshold respectively, the number being passed if the number is between the thresholds.

$$clip(X) = X \text{ if } T1 \leq X \leq T2$$

$$T1 \text{ if } X < T1 \text{ or } X = T1$$

$$T2 \text{ if } T2 < X \text{ or } X = T2$$

Typically T1 and T2 are positive and negative and of substantially the same size. Instead a softer form of clipping may be used, wherein clip(X) already falls below X when X is slightly below T2. Preferably, the clipping function outputs only N bits (N=4 for example) that represent numbers from the highest threshold to the lowest threshold. K1-K4 are border values that are taken from respective fields from third operand input 30*c*. M1-M6 are clipped results that are output in respective fields at result output 34.

In operation the functional unit is used to execute instructions of a program for processing a modulated data signal. The program contains a DEMAP instruction call, which may be represented symbolically as

DEMAP R1, R2, R3, R4

In this denotation R1, R2 etc. denote register selection codes that identify registers in register file 22 that are used to provide operands and to write results of the instruction. However, instructions will be described herein colloquially by saying that R1 etc. "is" a register. This should be understood to mean that R1 etc. denotes a selection code that identifies a register in register file 22. Even more colloquially it will be said that R1 etc. "is an operand". This should also be understood to mean that R1 etc. denotes a selection code that identifies a register in register file 22 that contains the operand.

In this denotation DEMAP denotes the op-code that identifies the instruction, R1, R2 are operand registers that contain complex numbers. R3 is an operand register that contains border value data. R4 is a result register to which a result with a plurality of bit metrics produced by execution of the DEMAP instruction will be written.

In one embodiment the DEMAP instruction is used during processing of a received DVB signal. Signal samples are obtained from the parts of the received signal that contain modulated digital data and Fourier transform coefficients for respective frequencies are computed from the samples. In the case of DVB reception that phase and amplitude of each Fourier transform coefficient represent a group of bits. The DEMAP instruction serves to decode the bits. A complex number that corresponds to a Fourier transform coefficient is loaded into R1 and bit metrics for the bits are output to register R4.

FIG. 4 illustrates the principle of decoding. In this figure a point 40 is indicated that corresponds to the amplitude and phase of a Fourier transform coefficient that has been obtained from samples of a received signal. The closest nominal complex number that can have been used during transmission corresponds to modulation of the digital bits 0011. In an embodiment wherein clipping circuits 32*a-f* are arranged to output one of two digital values only, the DEMAP instruction will produce these digital bits as output. However, more preferably, clipping circuits 32*a-f* are arranged to select their output from more than two values, and in this case the outputs represent the distance to the dividing lines 42, 44, 46 between the regions in the complex plane that are nearest to different nominal modulation points. Outputs of clipping circuits 32*a,b* output information about the distance to the axes 46. An output of clipping circuit 32c outputs information about the distance to one of the vertical lines 42 that is in the halfplane wherein the point 40 lies. An output of clipping circuit 32d outputs information about the distance to one of the horizontal lines 44 that is in the halfplane wherein the point 40 lies. The outputs of clipping circuits 32e,f are irrelevant in the 16-QAM case that is illustrated. Clipping circuits 32a-f clip their outputs, i.e. when the distance to the relevant line exceeds a clipping threshold the clipping threshold is output. Typically, the clipping threshold is of the order of magnitude of the distance between a line 42, 44, 46 and the nearest nominal modulation point.

During transmission of DVB signals the different frequency components of the signal may be transferred with mutually different phase and amplitude changes. Reflections from buildings, moving objects like aircrafts or changing atmospheric conditions can cause changes in these differences. During demodulation the receiver compensates for the differences. In the DEMAP instruction register R2 and the border values from R3 are used to correct for the differences.

The phase and amplitude effect of transmission are estimated for different frequencies, for example from measurements of received pilot signals. From this a complex factor H is determined for each Fourier transform coefficient, which represents the effect of transmission on the Fourier transform coefficient. Before extraction of bit metrics from a Fourier transform coefficient from register R1 information that represents the factor H is loaded into register R2 and the squared absolute value of the factor H is used to compute the border values in R3.

In response to the DEMAP instruction the Fourier transform coefficient in R1 is multiplied with the complex conjugate of H, using information from R2. In the resulting product the phase effect of transmission has been eliminated. However, in this case the amplitude of the products for different Fourier transform coefficients still depend on transmission effects, in proportion to the square of the amplitude of the factor H for the Fourier transform coefficients. In terms of the charts of FIG. 3 this means that the position of the lines 42, 44 midway rows and columns of the points depends on the square of the amplitude of the factor H. This means that the border values between points in the complex plane that are closer to one nominal modulation point and another depends on the square of the amplitude of the factor H. The border values in operand register R3 define these border values. During execution of a program that includes the DEMAP instruction these border values are preferably set in proportion to the square of the amplitude of the factor H to account for difference in amplitude transfer during transmission.

The following is an example of the program context in which the DEMAP instruction may be used in a program for demodulating digital data from a received signal. repeat
    instructions to compute phase and amplitude effect of transmission
    instructions to load complex factor that represents computed effect into R2
        instructions to compute the square of the amplitude
        instructions to compute border values in proportion to the square instructions to load the border values into R3
        instructions to load new coefficient into R1
    DEMAP R1, R2, R3, R4
    instructions to process bit metrics from R4

The program contains a loop in which execution of instructions is repeated for different frequencies. Methods of computing the phase and amplitude effect of transmission as a function of frequency are known per se. These methods produce a complex factor, of which the real and imaginary part may be loaded into R2. In this case complex multiplier circuit 31 should be arranged to form a product of the complex number from R1 and the conjugate of the number from R2 (alternatively the real and imaginary part of the conjugate may be loaded into R2, in which case the normal product may be formed).

The border values that are intended for subtracting circuits 36a,b may be set to the same value, which is varied in proportion to the square of the computed amplitude of the transmission effect. In the example of FIG. 4 the value of the input to subtracting circuit 36a is preferably set to a value equal to the nominally expected difference between the real part of the result of complex multiplication when the third bit of the modulated data is changed. Preferably the value for input to subtracting circuit 36b is set to the same value as that of the input to subtracting circuit 36a. Preferably the values for input to subtracting circuits 38a,b are set to half this value.

In this way, both the operand in R2 and the operand in R3 will depend on the correction that has to be made to compensate for transmission effects. As an alternative, a complex divider circuit may be used instead of complex multiplier 31. As an alternative the inverse of the factor H may be computed by other instructions and supplied to second operand input 30b. In these alternatives there is no need to make the border values dependent on transmission effects, so that the third operand input 30c may be omitted. However, use of division increases the time needed to perform demodulation.

The DEMAP instruction extracts bit metrics for a number of bits dependent on its input operands. Typically, each bit metric represents a number that is proportional to the distance between the Fourier transform coefficient (represented by point 40) and a respective border line 42, 44, 46, unless this distance exceeds a maximum, in which the bit metric is clipped. In a typical example four bit are used for each bit metric.

The further instructions for decoding typically involve depuncturing of the demodulated digital data (i.e. adding default bit metric values at selected positions) and ECC decoding. Preferably vector type instructions are used for this purpose, which treat their operands as a vector of bit metrics. In this case execution speed is increased, because the DEMAP instruction immediately makes the bit metrics available in vector form. Preferably, the processor also has an instruction to perform depuncturing in vector form. This is described in a co-pending patent applications by the same inventors and assigned to the same assignee.

FIG. 5 shows a further embodiment of a demap functional unit. In this embodiment the absolute value determination circuits, subtracting circuits and clipping circuits are shown as blocks 52, 54 that produce respective pairs of bit metrics at result output 34. In this embodiment the demap functional unit has a further input 50 for providing a control signal that provides information about the type of demapping that is needed, i.e. whether BPSK, QPSK, 16 QAM or 64 QAM demodulation is being performed. The demap functional unit is arranged so that it at least partly disables operation of parts of the demap functional unit dependent on the control signal. When BPSK is indicated blocks 52, 54 and clipping circuit 32b are disabled. When QPSK is indicated blocks 52, 54 are disabled. When 16-QAM is indicated block 54 is disabled. "Disabling", as used here, may be realized in various ways, for example by forcing the inputs of the blocks 52, 54 and clipping circuit 32b to retain predetermined values, so that data dependent signal transitions are prevented, or by cutting power supply to at least part of these circuits. Both have the effect of reducing power consumption in these circuits, while preventing that data dependent bit metrics are output. In this way power consumption can be reduced dependent on the type of modulation.

In principle the operations that the demap functional unit performs in response to the DEMAP instruction need not depend on the type of demodulation. However, dependent on the type of modulation more or fewer bit metrics will be used. In the case of BPSK only one bit metric will be used, from clipping circuit 32a. In the case of QPSK only two bit metrics will be used, from clipping circuits 32a, b. In the case of 16-QAM only four bit metrics will be used, from clipping circuits 32a-d. In the case of 64-QAM six bit metrics will be used, from clipping circuits 32a-f. Therefore, corresponding parts of the circuit may be disabled without affecting the ultimate result of decoding.

In one embodiment different instruction types (op code values) are available for controlling operation of the demap functional unit for different types of modulation. In this embodiment further input 50 is coupled to the instruction issue unit to receive a signal that depends on the type of the instruction (contains part of the op code for example). In an alternative embodiment further input 50 is an operand input for a fourth operand. In this embodiment a single type of instruction suffices and information about the type of demodulation is supplied from an operand register.

Preferably, all circuits that are not needed to produce a bit metric for a current type of demodulation are disabled. But it should be appreciated that, without deviating from the invention, only part of these circuits may be disabled. This already leads to reduction of power consumption. For example, in an embodiment only block 54 may be selectively disabled, dependent on whether 64 QAM modulation is demodulated or not.

Although the invention has been described in terms of specific embodiments, it should be appreciated that, without deviating from the invention, various alternative implementations are possible that produce the same effect. For example, although circuits that determine the difference between their input signals may be used as subtracting circuits 36a,b, 38a,b, it should be appreciated that adder circuits may function as subtracting circuits, for example if negative border values are supplied or if the absolute value determination circuits are designed to output minus the absolute value to an adder input. It should be clear that it does not matter if the signs of some or all of the bit metrics at the output are inverted, if the bit metrics are handled accordingly. Also, the number |K−|R|| may be computed equivalently for example as sign(R)(K*sign(R)−R) or one of K−R or K+R selected by a multiplexer under control of sign R etc. Instead, results that are similar but not identical to differences may be used, such as 1-|R|/K etc.

Furthermore, an embodiment has been shown wherein the operands contain both real and imaginary parts, it should be appreciated that alternatively one or more groups of separate operands may be used for real and imaginary parts. In this case the DEMAP instruction may have four or five operands instead of three. When thirty-two bit operands are used each operand may contain a sixteen bit real part and a sixteen bit imaginary part, but a smaller number of bits may be used, e.g. ten bits per number. Also, of course, larger or smaller operands may be used.

Similarly, although an embodiment has been shown wherein border values are supplied together in a third operand, preferably as numbers with substantially the same number of bits as the real and imaginary parts of the first two operands, it should be appreciated that instead a larger number of operands may be used to supply the border values, e.g. two operand registers, each for a pair of border values for a respective block 52, or four operand registers. As another alternative the same part of the operand input may be coupled to a pair of subtracting circuits so that only one border value needs to be supplied for both subtracting circuits. If this is done for both pairs 36a,b and 38a,b only two border values need be supplied at the third operand input.

As another alternative, the demap functional unit may be arranged to form border values for subtracting circuits 36a and 38a from a common input, e.g. by halving the border value from the input of subtracting circuit 36a to obtain the input value for subtracting circuit 38a. This reduces the amount of operand data that needs to be supplied (less operand inputs or lower width), while it preserves to use the possibility of using modulation types wherein difference between the nominal points in the complex plane in the real direction differs from the distance between the nominal points in the imaginary direction. As a further alternative the demap functional unit may be arranged to form input values for all subtracting circuits 36a,b and 38a,b from a single common input, for example by applying this input to both subtracting circuits 36a,b and half the input value to both subtracting circuits 38a,b.

Furthermore, although an application to DVB decoding has been described, it should be appreciated that the DEMAP instruction may be applied to demodulation of any type of signal. It is not necessary that the demap instruction is applied to Fourier transform coefficients in this case. When 16-QAM decoding is needed but no 64-QAM decoding is needed block 54 may be omitted. When higher order demodulation (e.g. 256-QAM) is needed another block may be added. When there is no need to correct for variable phase effects a variant of the DEMAP instruction may be used wherein the second operand and complex multiplier circuit 31 are omitted. Optionally also the third operand may be omitted in this case, or when the inverse of the factor H due to transmission is first computed.

The invention claimed is:

1. A programmable signal processing circuit, comprising an operand storage circuit;
an instruction processing circuit, to execute instructions that address locations of operands and results in the operand storage circuit, an instruction set of the instruction processing circuit comprising a demapping instruction, the instruction processing circuit having a first operand input or inputs to receive a complex number operand of the demapping instruction from the operand storage circuit, a second operand input or inputs to receive a further complex number operand of the demapping instruction, a third operand input or inputs to receive a border value operand and a result output to write a demapping result of the demapping instruction to the operand storage circuit, the instruction processing circuit being arranged to determine at least four bit metrics in response to the demapping instruction, each indicating a relative position of the complex number relative to a respective border line in a complex plane, and to write a combination of the at least four bit metrics together to the result output as the demapping result, wherein the instruction processing circuit comprises;
a complex number multiplier circuit having inputs coupled to the first and second operand input or inputs, to perform a complex multiplication of the complex number operand and the further complex number operand, and outputs for a real part and an imaginary part of a product respectively;

subtracting circuits, each having a first input coupled to a respective one of the outputs of the complex number multiplier circuit and a second input coupled to the third operand input or inputs;

saturation circuits coupled between the result output and respective ones of the outputs of the complex number multiplier circuit and outputs of the subtracting circuits, which saturation circuits represent their respective input values from a highest threshold to a lowest threshold by a plurality of bits, a respective input value being converted to a maximum value or a minimum value when said respective input value is above the highest threshold or below the lowest threshold respectively, the lowest threshold being below the highest threshold.

2. A programmable signal processing circuit according to claim 1, wherein said saturation circuits are clipping circuits, said clipping circuits passing their input values in a range between the lowest threshold and the highest threshold.

3. A programmable signal processing circuit according to claim 1, wherein the instruction processing circuit is arranged to determine at least six bit metrics in response to the demapping instruction, each indicating a relative position of the complex number relative to respective border line in the complex plane, and to include the at least six bit metrics at the result output in the combination that forms the demapping result.

4. A programmable signal processing circuit according to claim 3, wherein the instruction processing circuit further comprises:

second subtracting circuits, each having a first input coupled to an output of a respective one of the first subtracting circuits and a second input coupled to the second further operand input or inputs.

5. A programmable signal processing circuit according to claim 1, wherein the instruction processing circuit comprises a circuit part to compute part of the at least four bit metrics, the instruction processing circuit being arranged to disable the circuit part selectively, under control of control information specified by the demapping instruction.

6. A programmable signal processing circuit according to claim 1, programmed with a program to perform signal processing of a received signal, the program comprising an instance of the demapping instruction, using a complex number derived from the received signal as the complex number operand and a further instruction that uses the at least four bit metrics from the demapping result of the demapping instruction in parallel.

7. A programmable signal processing circuit according to claim 1, programmed with a program to perform signal processing of a received signal, the program comprising:

one or more instructions to establish a complex transmission factor that describes a phase and amplitude transformation to which the received signal has been subjected;

an instance of the demapping instruction, using a complex number derived from the received signal as complex number operand, using the complex transmission factor as the further complex number operand, and using a number determined in proportion to a square of an amplitude of the complex transmission factor as the border value operand; and a further instruction that uses the at least four bit metrics from the demapping result of the demapping instruction in parallel.

8. A method of processing a received data signal, the method comprising:

receiving a transmitted signal;

computing a complex number from the data signal;

determining a complex factor that represents a phase and amplitude transformation to which the received signal has been subjected;

determining a border value in proportion to a square of the amplitude of the complex factor;

providing an instruction processing circuit;

using a single instruction of the instruction processing circuit to form at least four bit metrics in a demapping result of the single instruction from the complex number, the complex factor, the border value, each of the at least four bit metrics indicating a relative position of the complex number relative to respective border line in a complex plane;

the executing the single instruction including:

complex multiplying the complex number with the complex factor in response to the single instruction to compute a product with a real part and an imaginary part;

using the border value to control a position of at least one of the border lines by subtracting a respective one of the real part and the imaginary part from the border value to compute a first subtraction result and a second subtraction result;

providing the demapping result by saturating respective values of the real part, the imaginary part, the first subtraction result and the second subtraction result, which saturating comprises representing said values from a highest threshold to a lowest threshold by a plurality of bits, a respective value being converted to a maximum value or a minimum value when said respective input value is above the highest threshold or below the lowest threshold respectively, the lowest threshold being below the highest threshold, and using the demapping result as an operand of a further instruction that processes the at least four bit metrics in parallel.

9. A method according to claim 8, comprising using respective single instructions of the instruction processing circuit to form respectively different demapping results, each comprising a respective different number of bit metrics; and selectively disabling a part of the instruction processing circuit that forms part of the bit metrics when executing selected ones of the single instruction.

* * * * *